United States Patent

[11] 3,633,768

[72] Inventor Jean Guigan
 Paris, France
[21] Appl. No. 66,723
[22] Filed Aug. 25, 1970
[45] Patented Jan. 11, 1972
[73] Assignee Hoffmann-La Roche Inc.
 Nutley, N.J.
[32] Priority Sept. 2, 1969
[33] France
[31] 6929961

[54] STORAGE AND DISTRIBUTION APPARATUS
 8 Claims, 6 Drawing Figs.
[52] U.S. Cl.................................................. 214/8.5 K,
 23/253, 23/259, 141/168, 221/11
[51] Int. Cl..................................................... B65g 59/06
[50] Field of Search........................................... 214/8.5 A,
 8.5 K, 8.5 R; 221/11; 23/253, 259; 141/130, 168

[56] References Cited
UNITED STATES PATENTS
2,542,067 2/1951 Waite............................ 221/11
3,570,555 3/1971 Gilson.......................... 23/253 X Primary Examiner—Gerald M. Forlenza
Assistant Examiner—George F. Abraham
Attorneys—Samuel L. Welt, Jon S. Saxe, Bernard S. Leon, William G. Isgro, Margaret C. Bogosian and Jacob Frank ABSTRACT: The present invention relates to an apparatus for carrying and storing containers. The apparatus, when operated, permits movement of the containers past a device which is adapted to take from the containers material contained therein. Preferably, the containers contain specimens taken from humans which are to be analyzed in an automated system in a continuous manner. The automated system may, for example, determine the presence in body fluids of diagnostically significant factors such as the quantity of sugar, urea and the like.

STORAGE AND DISTRIBUTION APPARATUS

DETAILED DESCRIPTION OF THE INVENTION

In prior application Ser. No. 666,302 filed Sept. 8, 1967 in the names of Jean Guigan and Robert Laucournet, a device for the automatic analysis of data is described. This device is particularly designed for the measurement of physiological data such as the amount of urea, the amount of cholesterol, the number of leucocytes per unit of blood volume, the amount of sugar, etc., in various samples obtained from warm-blooded mammals such as man. The present invention provides a new and improved apparatus for making available to embodiments of the device described in said application Ser. No. 666,302, the specimen to be analyzed for diagnostically significant features.

While the apparatus described and claimed herein is particularly suited for use with the device described in prior application Ser. No. 666,302, it, of course, is to be understood that its applications are many and it obviously can be also used with other systems designed to take from a container, some or all of the substance contained therein. It should be evident that to avoid obstruction problems, it is of importance to effect the storage of the containers in superposed layers. However, such a structural arrangement usually carries with it the difficulty that the movement of one layer of containers to the next introduces a period where the provision of the analyzing system with samples is interrupted. This discontinuity of operation or interruption caused by awaiting the next layer of containers to be placed in a position whereat the samples contained therein can enter the analyzing machine is an obvious disadvantage since it prevents maximum efficiency. By the present invention this interruption is avoided since the inventive apparatus permits storage of the containers in several layers and yet, provides for a noninterrupted, continuous filing of the containers past a fixed device.

The present invention, therefore, has for one of its objectives, the provision of an apparatus for the storage and distribution of containers arranged in superposed layers, which apparatus is capable of permitting a continuous passage or filing of the said containers beneath a fixed device, said fixed device being in a preferred embodiment one that conducts an analysis for diagnostically significant factors. It is another object of the present invention to permit the selection of any one of the containers contained on the stacked rows for passage beneath a fixed device whereby a substance contained therein can be taken up by the fixed device and entered into a system for automatically analyzing the characteristics of one substance for diagnostically significant factors.

In achieving the objectives of this invention, there is provided an apparatus for permitting containers to pass before a fixed device in a continuous fashion, said apparatus being provided with carrying members (preferably in a semicircular plate shape), said containers being disposed at the curved periphery of the said semicircular carrying members, the said carrying members being superposed in at least two stacks, preferably defining a cylindrical configuration, each stack being placed upon a supporting member, preferably having the same shape as the said carrying members (again preferably a plate-shaped configuration).

The said apparatus is provided with means for guiding the said members in a vertical direction and means permitting displacement of said members in a vertical direction, said guiding and displacement means being movable about an axis coincident with the axis of the said stacks, energizing means for moving the displacement means and locking means placed at a given height for retaining the carrying member at a desired level.

In a preferred embodiment of the invention, the said means for guiding each supporting member in a vertical direction includes fixed parallel bars. The parallel bars have said supporting members slidably received thereon. The said means which cause movement of the supporting members in a vertical direction includes vertically threaded rods threadedly received in female threads which are integral with said supporting members. The said threaded rods are driven by any suitable energizing means. The apparatus also includes locking means biased toward a locking position and being movable out of this position. The locking means are constructed and arranged so as to permit the movement of the carrying members in an upward vertical direction, yet prevent movement of the carrying members in an opposite direction. Each locking means comprises two arms biased away from each other by a biasing means. The arms are retractable toward each other against the biasing means either as a result of movement of a carrying member in an upward direction past the locking means or as a result of the energization of a means for retracting the arms. Each of said carrying plates are guided vertically by the same guiding means as the supporting members.

THE PREFERRED EMBODIMENT

The preferred embodiment shown in FIGS. 1, 2, 3a, 3b, 3c and 3d includes by dotted line, an analyzing apparatus 31 such as is shown in U.S. Pat. Application Ser. No. 666,302 referred to above.

Figure 1:
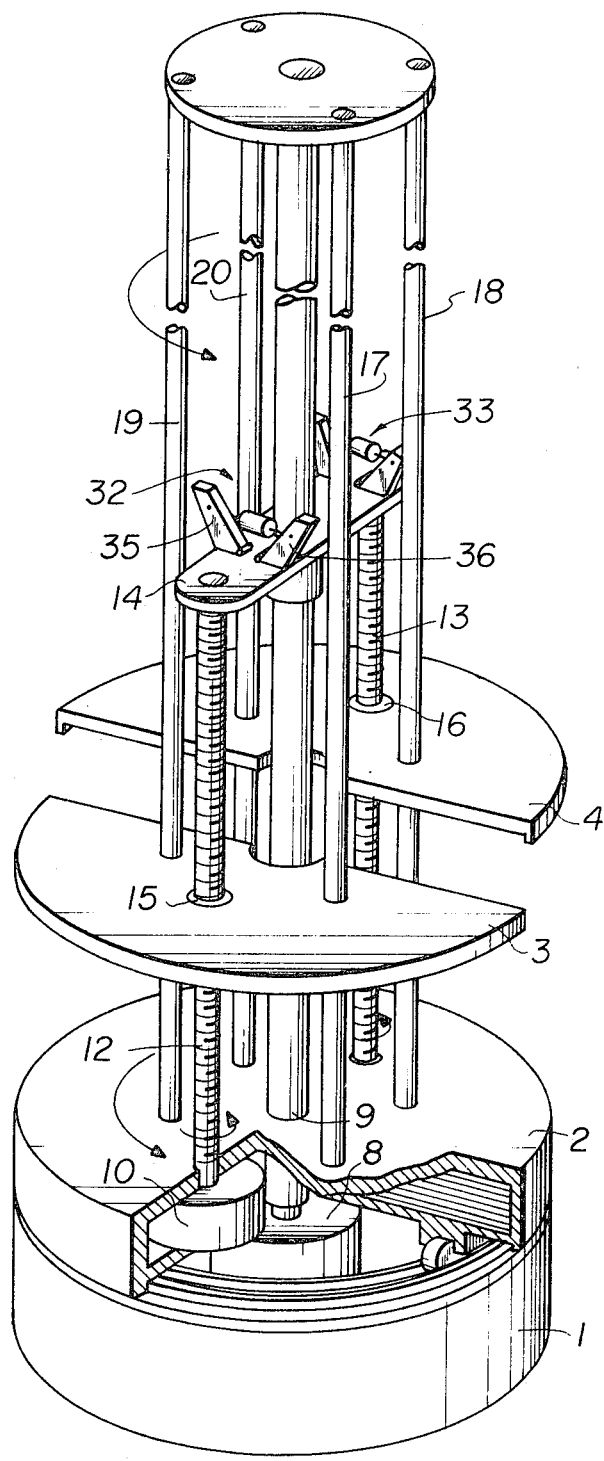
FIG. 1 is a view in partially exploded perspective of the apparatus lacking carrying members and the containers.
Figure 2:
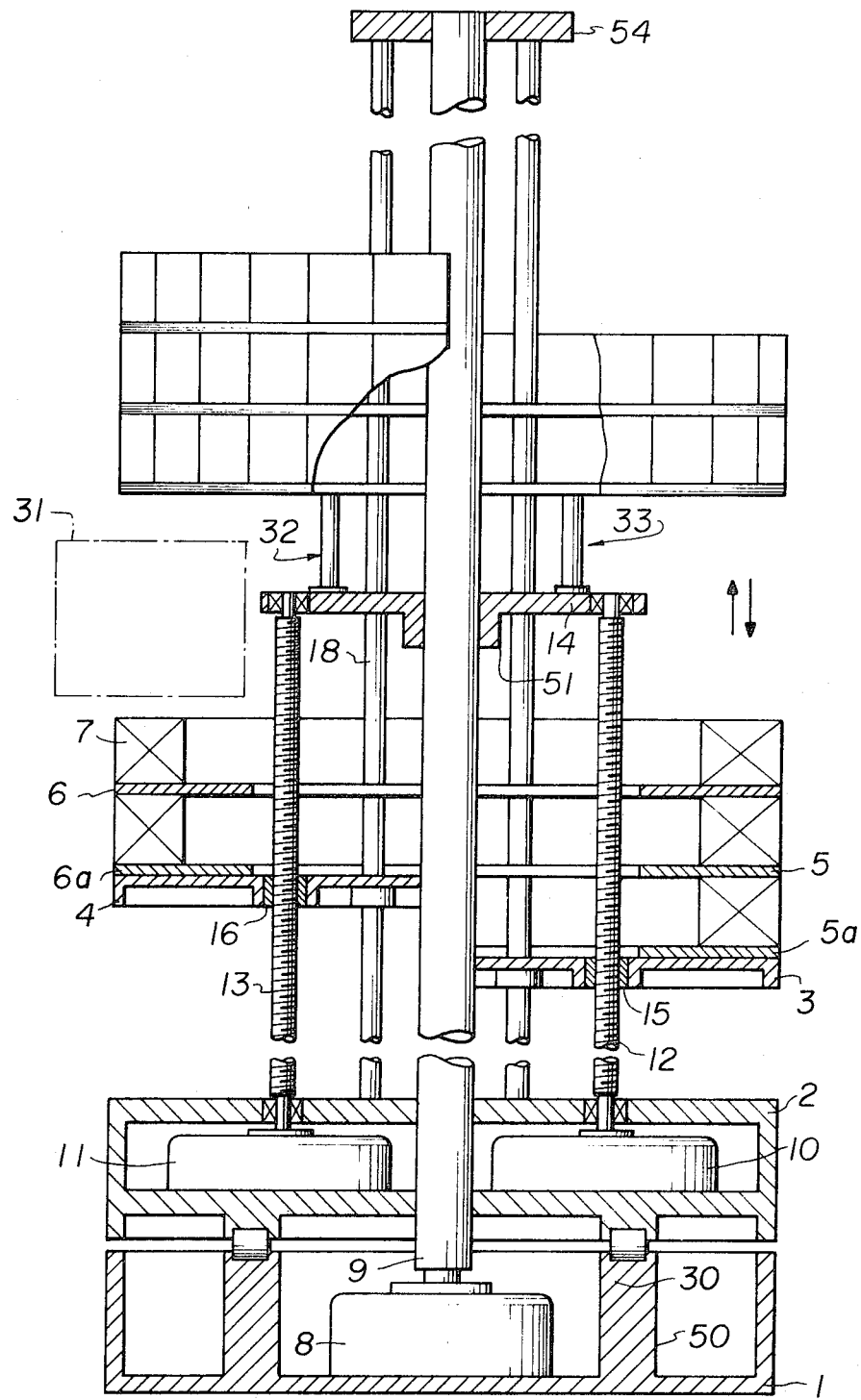
FIG. 2 is a front view in partial section of the apparatus.

FIG. 1 as indicated above represents the apparatus in perspective without the carrying member and the containers. FIG. 2 shows the apparatus with the carrying members and the containers in partial section. These two views permit the different parts of the apparatus to be distinguished and its operation to be made apparent.

Base 1 is fixed so that movement thereof is prevented. Base 1 contains a motor 8 of the step-by-step type. Motor 8 drives a shaft 9 about its longitudinal axis. A circular compartment 2 connected to shaft 9 rests on the base 1. The base 1 is provided with an upstanding portion, which upstanding portion 50 contains on the upper end thereof, a groove in which there is received rollers 30 rotatably secured to projections positioned on the underside of compartment 2. Compartment 2 has fixedly secured thereto, one end of each of four vertical rods 17, 18, 19 and 20. Vertical rods 17, 18, 19 and 20 are secured on their other end to a support 54. The support also has an opening in which is received shaft or axle 9. Also, in two openings on the upper side of compartment 2 there are rotatably received two threaded rods 12 and 13. Threaded rods 12 and 13 are rotatable about their vertical axis by motors 10 and 11, which motors are contained in compartment 2. The other ends of the threaded rods 12 and 13 are fixedly secured to a bracket 14. Bracket 14 is integrally secured to shaft 9. In the preferred embodiment, bracket 14 is provided with an opening along its central transverse axis defined by a downwardly extending flange 51. The shaft 9 is received in the said opening and is fixably secured to the axle 9 by any suitable means, e.g., by a lug projecting from the inner surface of the flange which is received in a groove in the shaft 9 or by a resilient spring washer, either secured to the shaft 9 or the flange 51 and adapted to be received in a suitable depression in the other member in accordance with conventional techniques.

Two semicircular supporting members, namely, supporting plates 3 and 4, are provided with two apertures having female threads 15 and 16, respectively, formed on the walls defining the apertures. Additional apertures on the supporting plates 3 and 4 receive rods 17–19 and 18–20 for relative vertical movement. Threaded rods 12 and 13 are threadedly received in female threads 15 and 16, respectively. Vertical movement of the plates 3 and 4 is effected by rotation of the threaded rods 12 and 13 under the respective influences of the motors 10 and 11. It should be understood, for example, that when the motor 10 is actuated, the threaded rod 12 rotates about its vertical axis and this rotation causes concurrent movement of plate 3 in a vertical direction along the longitudinal axis of the threaded rod 12. Also, when motor 8 is actuated, movement of plate 3 about the longitudinal axis of shaft 9 results. While the supporting plates 3 and 4 are shown as having a semicircular configuration can be utilized depending, for example, upon the shape of the container, or the most expedient configuration as the case may be.

The containers 7 containing the product to be analyzed for diagnostically significant factors are disposed, in a preferred embodiment, on the curved periphery of container-carrying members, namely plates 5, 5a, 6 and 6a, etc. The geometric axis of plates 5, 5a, 6 and 6a is a coincident with the vertical (or longitudinal) axis of shaft or axle 9. The plates 5, 5'a, 6 and 6a are divided into two stacks and are carried by the supporting plates 3 and 4. It should be understood that the apparatus may carry additional plates corresponding to plates 6, 6a, 5 and 5a other than those illustrated depending upon the situation.

The locking means 32 or 33 which hinder downward displacement of certain of the plates 5, 5a, 6 and 6a are each disposed adjacent opposite ends of the bracket 14. Each locking means 32 and 33 include two arms 35 and 36, each arm being articulated about axis integral with bracket 14. The arms are spring biased in a direction which brings their free ends outwardly of the planes of the adjacent longitudinal edges of bracket 14. Thus, the arms are disposed in the path of vertical movement of carrying plates 5, 5a, 6 and 6a when in locking position. The locking arms are operately connected to an electromagnet. When the electromagnet is actuated, such causes the free ends of the locking arms to be drawn inwardly against the bias of the spring means toward a point whereat such ends are disposed inwardly of the planes defined by the longitudinal edges of bracket 14. The carrying plates are provided with openings therein which permit passage thereof past the bracket 14.

The operation of the apparatus described with reference to FIGS. 1 and 2 is indicated schematically in FIGS. 3a, 3b, 3c and 3d.

When it is desired to analyze the multiple samples, the carrying plates are loaded or charged with the containers 7 as illustrated in FIG. 2. The supporting plates 3 and 4 are then in their uppermost positions which is the same for both plates 3 and 4. The analyzing device indicated by outline 31 is situated beneath one of the two supporting plates 3 or 4, each of which, when loaded, support a stack of plates A and B. The free ends of the locking means 32 and 33 are disposed outside the plane of bracket 14 below the second carrying plate in the series of carrying plates that constitute the stack of plates A and B preventing movement of the second plate and those stacked on it in a downward vertical direction.

In order to move the first plate of stack A to a position whereat the contents of the containers can be fed into device 31, the motor 10 is energized. This causes rotation of the threaded rod 12, which rotation effects vertical movement of plate 3 and plate 5a disposed thereon. Horizontal movement of plate 3 is effected by rotation of shaft 9, and it is done in increments which assure that each container comes to the proper position below the device 31. In this way, there continuously files before the device 31, each of the containers 7 so that materials contained therein can be fed into the analyzing device 31.

Figure 3A:
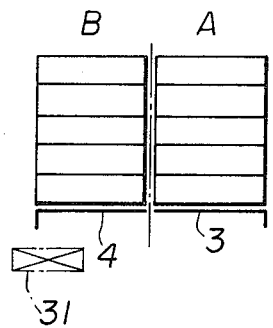
FIGS. 3a, 3b, 3c and 3d show in schematic form the operation of the apparatus.
Figure 3B:
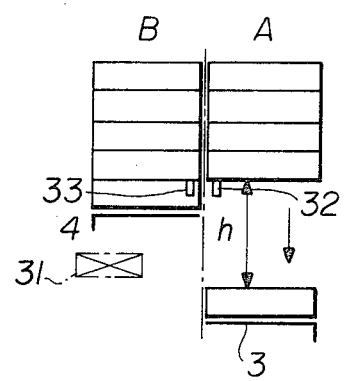
Figure 3C:
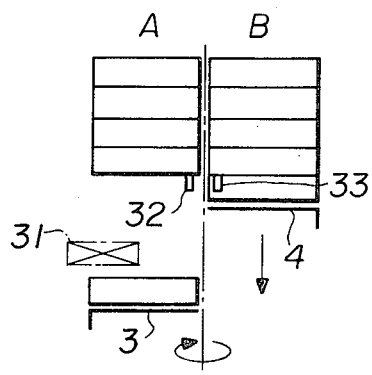
Figure 3D:
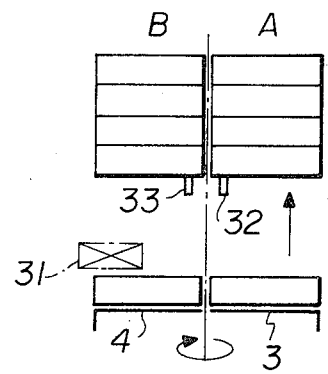

The height of the displacement as is evident from the drawing is such that the upper surface of the container 7 placed on the first plate 5a is below the lower part of the device 31 (FIG. 3c). The rotary movement as indicated above is done by such measured increments so that each container comes to the appropriate position before the device 31 whereby the mechanism of device 31 for that purpose can withdraw the appropriate amount of sample. During this rotary movement, the space situated below the support 4 is free and the latter can descent freely. The locking means 33 placed along stack B at a level of the second plate maintains the second plate 6 in its upper position while the support 4 to the same level as the support 3. When all of the containers from the first plate 5a of stack A have filed by the device 31, the containers from the first plate 6a of stack B will be in place and the march past machine 31 of the containers will continue uninterrupted (FIG. 3d) under the influence of step-by-step motor 8. The vertical movement of the support 3 again begins and plate 5 on stack A will be conducted after the plate 6a from stack B along the filing path adjacent the device 31.

As plate 4 files past device 31, the supporting plate 3 rises as far as to support all of the carrying plates back in the original position thereof, and while energizing the electromagnet to retract the locking arms, then descends so far as to bring the $n+1$ plate opposite the locking means. The electromagnetic is deenergized so that the locking means 32 locks downward movement of carrying plate $n+1$. Plate 3 again descends to a point whereat the upper part of the $n^{th}$ plate is situated at the point whereat the device 31 will be in position to withdraw a portion of a sample from the containers thereon upon rotation.

This apparatus permits the continuous movement of all of the plates alternatively from stack A and from stack B before device 31 without an interruption or a discontinuity in the filing operation. While in the preferred embodiment, the alternate seriatim movement of the containers from stack A and stack B is shown, it should be apparent that the apparatus described herein permits random access to a container previously designated by the rank of the carrying plate which supports it and its position on this plate. This random retrieval is accomplished by a memorization in coded form of the identity of each container and its location in the apparatus and the existence of means of control and of logical coordination of the moving elements of the apparatus. These means are well known and comprise electronic logic circuits directing and controlling the movements of the motors 8, 10 and 11 and of the locking devices 32 and 33.

As indicated above, in particular preferred application of the apparatus, the device described above permits the storage and the distribution of containers containing liquid specimens destined for multiple automatic analysis in a continuous fashion. For example, in the case of a blood specimen, the sample is placed in an identifiable container and the container is then placed upon a plate (5, 5a, 6 or 6a, etc.). A set of plates forming a cylindrical configuration can be placed in the interior of a centrifuge. Subsequently, this set, after centrifugation, in accordance with conventional procedure, can be put on the apparatus which is the object of the invention, with a view toward awaiting the transfer of the supernatant in calibrated quantities into device 31 for analysis. In connection with application Ser. No. 666,302, the supernatant can be fed into a compartment of a storage film destined for use in the analysis system described in "Apparatus For Multiple and Automatic Analysis" found in the prior application, Ser. No. 666,302. A logic circuit having a memory can be provided to permit a sampling from all of the containers whose content is destined for certain analysis. Therefore, the apparatus can have placed upon it different containers having specimens contained therein designed to be tested by different analytical procedures to determine diagnostically significant data. The logic circuit can permit those destined for a particular analysis procedure to be fed into, for example, the compartment of a storage film as indicated above. This filing past the analysis machine will be repeated as many times as are types of analysis to be effected.

While the drawing depicts one form of the invention, it will be understood that many variations are possible within the spirit and scope of the invention and the present invention may be embodied in other specific forms without departing from the spirit or essential attributes thereof.

We claim:

1. Apparatus for storage and distribution of containers arranged in superposed layers comprising a movable member mounted on a base for rotation about its vertical axis, carrying members, said carrying members being adapted to carry said containers, said carrying members being superposed so as to form at least two stacks of carrying members, at least the lowermost carrying member of each stack being supported by supporting members, means for vertically moving said supporting member, each of said carrying members being adapted to move vertically in response to vertical movement of its supporting member, means for guiding each supporting member and its associated carrying members along the path of the vertical movement thereof, said guiding means for each stack being secured to said movable member and locking means for each stack having a locking portion when in locking position disposed in the path of downward vertical movement of the carrying members whereby downward vertical movement of those carrying members positioned above the locking means is precluded when the locking portion is in locking position.

2. Apparatus as defined in claim 1 in which the said guiding means for each stack includes two parallel bars slidable received in openings in the supporting member and in the carrying members.

3. Apparatus in accordance with claim 1 in which the means for vertically moving each supporting member includes a vertically threaded rod cooperating with a female threaded member secured to the said supporting member, the said threaded rod being driven by a motor means whereby the vertical position of the supporting member may be controlled.

4. Apparatus in accordance with claim 1 in which the said locking means comprises for each stack of plates, two articulated arms biased away from each other and the locking portion comprises the upper ends of said arms, said ends being normally disposed in the path of vertical movement of the carrying members, said ends being movable out of the path of vertical movement of the carrying members either by engagement of the carrying members with the lower portions of the arms during movement of the carrying members in an upward vertical direction or by the action of an energizable means.

5. Apparatus as in claim 1 wherein the carrying members and the supporting member associated therewith are in semicircular plate form.

6. An apparatus as in claim 1 wherein the guiding means permit relative vertical movement of the carrying members and the supporting member associated therewith, but preclude relative rotational movement thereof, the means for moving the supporting member for each stack includes a threaded rod, the threaded rod being positioned on its lower end in said movable member and being positioned on its upper end in a bracket, said carrying members and the supporting member associated therewith being in semicircular plate form, said locking means include for each stack, two arms, said arms each being articulated at one end about an axle secured to said bracket, the locking portion comprises the free ends of said arms and said carrying member having an opening so sized as to permit passage thereof past said bracket.

7. Apparatus as defined in claim 1 in which the means for vertically moving each supporting member includes a vertically threaded rod cooperating with a female threaded member integral with the said supporting member, the said threaded rod being driven by a motor means whereby the vertical position of the supporting member may be controlled, said vertically threaded rod being positioned on its lower end in said movable member and being positioned on its upper end in a bracket, said carrying members and the supporting member associated therewith being in semicircular plate form, said locking means being articulated about an axle secured to said bracket and said carrying members having an opening so sized as to permit passage thereof by the bracket.

8. Apparatus as defined in claim 7 wherein the guiding means for each stack includes two parallel rods received in openings in the carrier members and the supporting member associated therewith, said parallel rods being fixedly secured at their lower ends to the movable member, motor means operatively connected with the movable member for effecting rotation thereof, said carrying members and the supporting member associated therewith being adapted to move vertically but not rotatably relative to said parallel rods.

* * * * *